Oct. 8, 1957    G. D. BAGLEY    2,809,026
FURNACE FOR HEATING REACTION VESSELS
Filed June 9, 1954    2 Sheets-Sheet 1

INVENTOR
GLEN D. BAGLEY
BY
John F. Holmann
ATTORNEY

Oct. 8, 1957 G. D. BAGLEY 2,809,026
FURNACE FOR HEATING REACTION VESSELS
Filed June 9, 1954 2 Sheets-Sheet 2
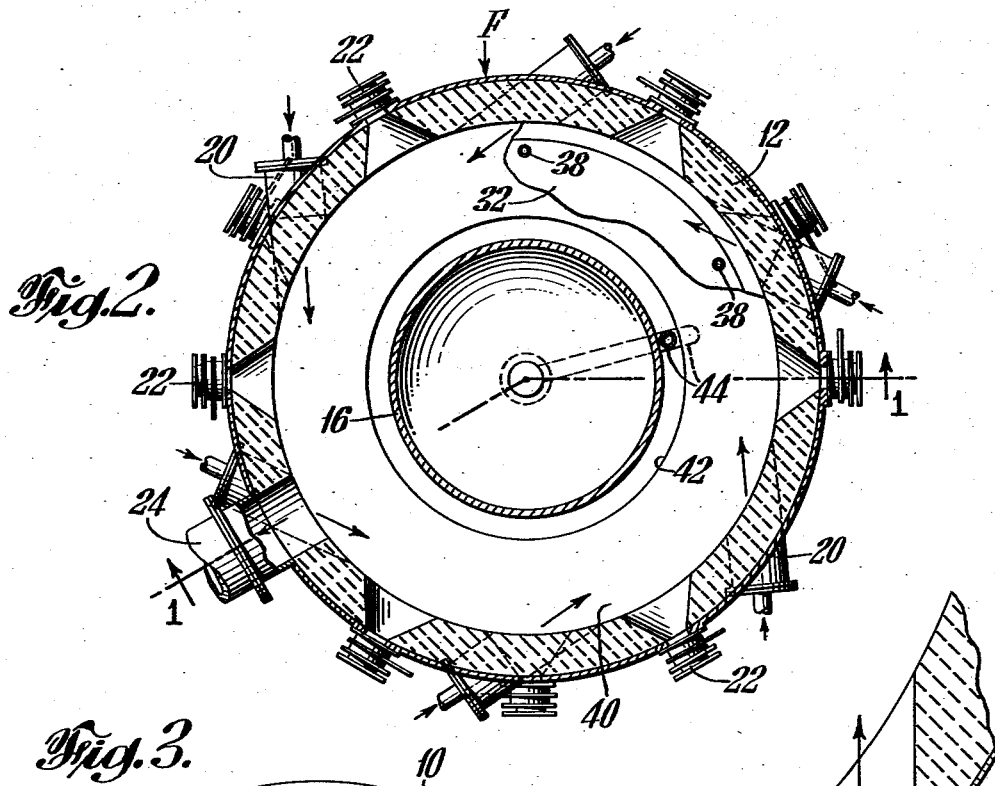
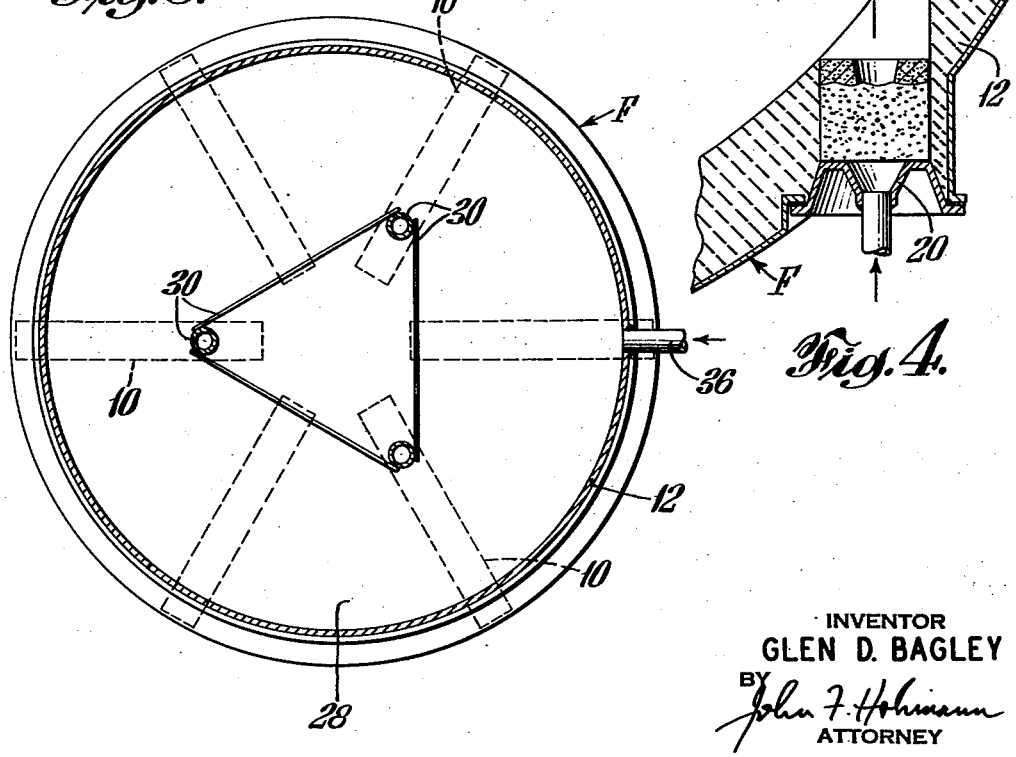
INVENTOR
GLEN D. BAGLEY
BY
John F. Hohmann
ATTORNEY United States Patent Office 2,809,026
Patented Oct. 8, 1957

2,809,026

FURNACE FOR HEATING REACTION VESSELS

Glen D. Bagley, Lewiston, N. Y., assignor to Union Carbide Corporation, a corporation of New York Application June 9, 1954, Serial No. 435,432

7 Claims. (Cl. 263—40)

The present invention relates to a furnace of the type employed for heating reaction vessels.

High melting point, reactive metals of groups IV, V and VI of the periodic table are generally produced by reducing a halide of the refractory metal with an alkali or alkaline earth metal. The operation may be carried on in a reaction vessel, the temperature of which must be properly regulated if the reduction reaction is to be safely controlled. Irrespective of the specific reduction technique used, the reaction is usually initiated by heating one of the reactants before the two are brought together or by heating a mixture of the reactants. Since the reaction is exothermic, little or no further heating may be required, and cooling may be desired. If the reduction reaction is carried out on a batch basis, external heating is required when the reaction is nearing completion, since the quantity of heat evolved from the reaction is then decreasing.

In order to suppress vapor phase reactions which may produce an undesirably fine metallic product, it is undesirable that the entire reactor should be heated. In the early stages of the operation, in fact, it may be necessary to heat one portion of the reactor while another portion is being artificially cooled. It is necessary, in order to accomplish this result, that the heating furnace containing the reaction vessel be so designed that the source of heat around one portion of the reactor will be kept away from the other portion of the reactor. Further, it is necessary that the heating furnace be capable of heating all portions of the reaction vessel so that, in the last stages of the reduction reaction, that portion of the reaction vessel which was originally artificially cooled may now be heated.

The alkali or alkaline earth metals have a great avidity for oxygen and will burn vigorously at elevated temperatures. In the event of reaction vessel leakage or failure, it is, therefore, highly desirable that provision be made for quickly removing any such metals that may escape from the reaction vessel from the oxidizing atmosphere of the heating zone.

It is therefore, the prime object of the present invention to provide a simple and efficient heating furnace which satisfies all of the above requirements.

Other aims and advantages of the invetnion will be apparent from the following description and the appended claims.

In the drawings:

Fig. 2 is a sectional view along the line 2—2 of Fig. 1;

Fig. 3 is a sectional view along the line 3—3 of Fig. 1; and

Fig. 4 is a partial sectional view along the line 4—4 of Fig. 1, showing details of burner construction.

Figure 1:
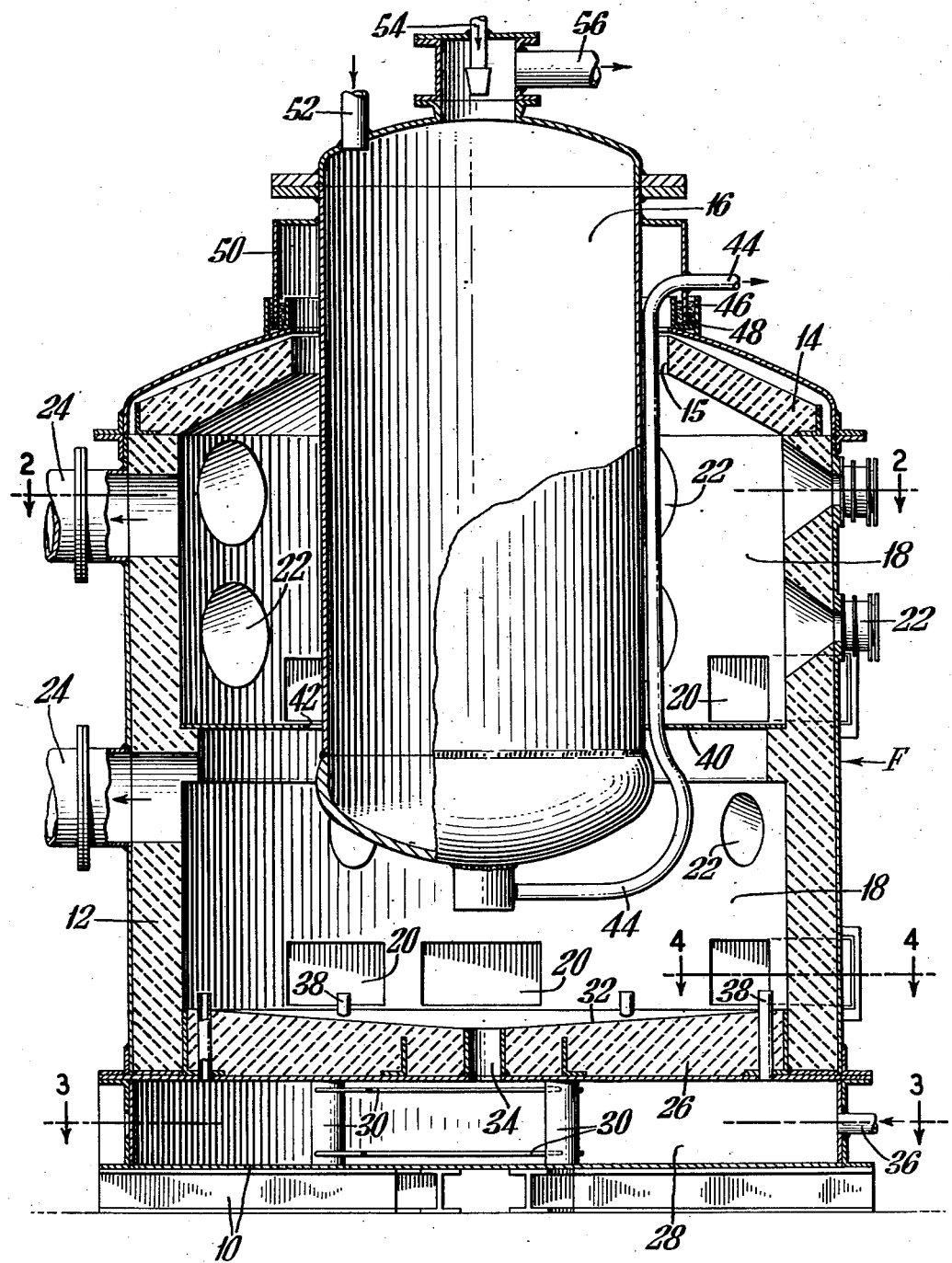
Fig. 1 is an elevational sectional view of a heating furnace embodying the invention.

In accordance with the present invention, a heating furnace F, is provided comprising a body having a base 10, side walls 12 and a cover 14 adapted, with an opening 15, to receive at least the major portion of reaction vessel 16 in the upper portion 18 thereof. A plurality of fuel burner means 20, such as shown in Fig. 4 of the drawings, is positioned around the upper portion 18 of furnace F and passes through side walls 12 into the interior of the furnace, each burner being adapted to direct heat against a selected portion of the surface of reaction vessel 16. Sight glass means 22 are similarly positioned around upper portion 18 of furnace F and pass through side walls 12 for observing the concentration of heat directed against portions of the surface of reaction vessel 16. Exhaust conduit means 24 are provided in the upper portion of side walls 12 for passing gaseous furnace products through exhaust fan means to vents (not shown).

A substantially horizontal partition 26 is provided, secured to side walls 12 near base 10, for forming a false bottom compartment 28 at the lower end of furnace F. Partition 26 may be constructed of any common structural material, but is preferably of refractory material. In the event that a refractory material is employed, reinforcing means 30 may be employed near the center of the suspension, to support the weight of the partition member.

It is the purpose of false bottom compartment 28 to provide a chamber for the reception and rapid quenching of combustible materials which may be released into the upper portion 18 of the furnace in the event of the failure of or leakage from reaction vessel 16. Accordingly, the upper surface 32 of partition 26 is inclined in all directions toward a vertical passage 34 in the partition which communicates between false compartment 28 and the upper portion 18 of furnace F. Any leakage of combustible materials will flow along surface 32 through passage 34 and into false bottom compartment 28.

Inlet means 36 is provided in the side walls 12 around false bottom compartment 28 for introducing an inert gas, such as argon, helium, nitrogen, and the like, into false bottom compartment 28. Inert gas is thus supplied to maintain a nonoxidizing atmosphere in false bottom compartment 28 which will rapidly quench any combustible leakage materials passed into the compartment from the upper portion of the furnace through passage 34. A plurality of vertical vent passages 38 is also provided to permit the passage of inert gas from compartment 28 to the upper portion 18 of furnace F and thence out through exhaust conduit means 24.

Baffle plate means 40 may be provided when it is desired to divide the upper portion 18 of furnace F into two separate but intercommunicating chambers which are to be maintained at different temperatures. Annular passage 42 between reaction vessel 16 and baffle plate means 40 provides a space through which gaseous furnace products may pass to exhaust conduit means 24, and through which outlet conduit 44 from the base of reaction vessel 16 may pass from the furnace. When such baffle plate means are employed, it is highly desirable to provide exhaust conduit means 24 associated with each of the chambers formed thereby. It is, of course, also necessary to provide burner means 20 associated with each of said chambers when such baffle means are employed.

By employing a baffle construction as described hereinabove, it is possible to heat different portions of the reaction vessel to different temperatures; indeed, it is possible to heat one chamber containing a portion of the reaction vessel, while cooling the other by passing relatively cool unburning gases through the burner means associated with that chamber.

As shown in Fig. 1 of the drawings, gas-tight sealing means 46 is provided around that region of furnace cover 14 where reaction vessel 16 is inserted into the furnace. This sealing means comprises a circular trough of sand, salt or the like 48 in which radial flange 50, secured to reaction vessel 16, rests. This construction forms a seal which prevents the escape to the atmosphere of vapors of alkali or alkaline earth metals, or their combustion products, which are instead passed through scrubbers in the exhaust gas system (not shown) leading from exhaust gas conduits 24. Conduits shown at the top of reaction vessel 16 are reactant inlet conduits 52 and 54 and outlet gas conduit 56.

A furnace similar to that shown in Figs. 1–4 of the drawings has successfully been employed to heat reaction vessels in the sodium reduction of titanium tetrachloride.

What is claimed is:

1. A furnace for selectively heating portions of a reaction vessel comprising, a furnace body having a base, side walls and a cover adapted to receive and hold in the upper portion of said furnace, in relatively gas-tight engagement, at least the major portion of said reaction vessel; a plurality of fuel burner means positioned around said upper portion of said furnace, passing through said side walls and adapted to direct heat toward selected portions of said reaction vessel therein; a plurality of sighting means positioned around said upper portion of said furnace and passing through said side walls for observing the concentration of heat directed against portions of said reaction vessel therein; exhaust means associated with the upper portion of said side walls for passing the gaseous furnace products from said furnace; a substantially horizontal partition member secured to said side walls near said base to form a false bottom compartment therebetween, said partition member having a relatively large vertical passage therethrough and an upper surface inclined in all directions toward said passage; and inert gas inlet means associated with said furnace side walls of said false bottom compartment for supplying inert gas to said false bottom compartment.

2. A furnace for selective heating portions of a reaction vessel in accordance with claim 1, wherein said reaction vessel is provided with an outer flange which rests in a trough secured to said furnace cover, said trough containing a dense inert material relatively impervious to the passage of gases therethrough.

3. A multi-chambered furnace for selectively heating portions of a reaction vessel comprising, a furnace body having a base, side walls and a cover adapted to receive and hold in the upper portion of said furnace, in relatively gas-tight engagement, at least the major portion of said reaction vessel; substantially horizontal baffle plate means secured to said side walls of said furnace in the vicinity of the lower end of said reaction vessel for dividing said upper portion of said furnace into two intercommunicating chambers; a plurality of fuel burner means positioned around said upper portion of said furnace, passing through said side walls into both of said chambers and adapted to direct heat toward selected portions of said reaction vessel therein; a plurality of sighting means positioned around said upper portion of said furnace and passing through said side walls for observing the concentration of heat directed against portions of said reaction vessel therein; exhaust means associated with the upper portion of said side walls for passing the gaseous furnace products from said furnace; a substantially horizontal partition member secured to said side walls near said base to form bottom compartment therebetween, said partition member having a relatively large vertical passage therethrough and an upper surface inclined in all directions toward said passage; and inert gas inlet means associated with said furnace side walls of said false bottom compartment for supplying inert gas to said false bottom compartment.

4. A furnace for selectively heating portions of a reaction vessel comprising, a furnace body having a base, side walls and a cover adapted to receive and hold in the upper portion of said furnace, in relatively gas-tight engagement, at least the major portion of said reaction vessel; a plurality of fuel burner means positioned around said upper portion of said furnace, passing through said side walls and adapted to direct heat toward selected portions of said reaction vessel therein; a plurality of sighting means positioned around said upper portion of said furnace and passing through said side walls for observing the concentration of heat directed against portions of said reaction vessel therein; exhaust means associated with the upper portion of said side walls for passing the gaseous furnace products from said furnace; a substantially horizontal partition member secured to said side walls near said base to form a false bottom compartment therebetween, said partition member having a relatively large vertical passage therethrough, an upper surface inclined in all directions toward said passage, and a plurality of relatively small gas vents passing vertically through said partition member thereby communicating between said false bottom compartment and said upper portion of said furnace; and inert gas inlet means associated with said furnace side walls of said false bottom compartment for supplying inert gas to said false bottom compartment.

5. A furnace for selective heating portions of a reaction vessel in accordance with claim 4, wherein said reaction vessel is provided with an outer flange which rests in a trough secured to said furnace cover, said trough containing a dense inert material relatively impervious to the passage of gases therethrough.

6. A multi-chambered furnace for selectively heating portions of a reaction vessel comprising, a furnace body having a base, side walls and a cover adapted to receive and hold in the upper portion of said furnace, in relatively gas-tight engagement, at least the major portion of said reaction vessel; substantially horizontal baffle plate means secured to said side walls of said furnace in the vicinity of the lower end of said reaction vessel for dividing said upper portion of said furnace into two intercommunicating chambers; a plurality of fuel burner means positioned around said upper portion of said furnace, passing through said side walls into both of said chambers and adapted to direct heat toward selected portions of said reaction vessel therein; a plurality of sighting means positioned around said upper portion of said furnace and passing through said side walls for observing the concentration of heat directed against portions of said reaction vessel therein; exhaust means associated with the upper portion of said side walls for passing the gaseous furnace products from said furnace; a substantially horizontal partition member secured to said side walls near said base to form bottom compartment therebetween, said partition member having a relatively large vertical passage therethrough, an upper surface inclined in all directions toward said passage and a plurality of relatively small gas vents passing vertically through said partition member thereby communicating between said false bottom compartment and the upper portion of said furnace; and inert gas inlet means associated with said furnace side walls of said false bottom compartment for supplying inert gas to said false bottom compartment.

7. A furnace for selectively heating portions of a reaction vessel comprising, a furnace body having a base, side walls and a cover adapted to receive and hold in the upper portion of said furnace, in relatively gas-tight engagement, at least the major portion of said reaction vessel; a plurality of fuel burner means positioned around said upper portion of said furnace, passing through said side walls and adapted to direct heat toward selected portions of said reaction vessel therein; a plurality of sighting means positioned around said upper portion of said furnace and passing through said side walls for observing the concentration of heat directed against portions of said reaction vessel therein; exhaust means associated with the upper portion of said side walls for passing the gaseous furnace products from said furnace; a substantially horizontal partition member secured to said side walls near said base to form a false bottom compartment therebetween, said partition member having a vertical passage therethrough; and inert gas inlet means associated with said false bottom compartment for supplying inert gas thereto.

References Cited in the file of this patent

UNITED STATES PATENTS

| | | |
|---|---|---|
| 837,273 | Angell | Dec. 4, 1906 |
| 2,591,097 | Pugsley | Apr. 1, 1932 |
| 2,610,109 | Adams et al. | Sept. 9, 1952 |
| 2,644,744 | Hartwig et al. | July 7, 1953 |
| 2,671,011 | Van Ackeren | Mar. 2, 1954 |
| 2,697,032 | Jones | Dec. 14, 1954 |
| 2,693,952 | Nesbitt | Nov. 9, 1954 |